(12) United States Patent
He

(10) Patent No.: US 12,118,160 B2
(45) Date of Patent: Oct. 15, 2024

(54) PRESSURE-SENSING MODULE AND ELECTRONIC DEVICE

(71) Applicant: VIVO MOBILE COMMUNICATION CO., LTD., Guangdong (CN)

(72) Inventor: Yifan He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/237,197

(22) Filed: Aug. 23, 2023

(65) Prior Publication Data

US 2023/0393682 A1   Dec. 7, 2023

Related U.S. Application Data

(63) Continuation of application No. PCT/CN2022/076758, filed on Feb. 18, 2022.

(30) Foreign Application Priority Data

Feb. 24, 2021 (CN) .......................... 202110204586.3

(51) Int. Cl.
*G06F 3/041* (2006.01)
*G06F 3/045* (2006.01)

(52) U.S. Cl.
CPC .......... *G06F 3/0414* (2013.01); *G06F 3/0412* (2013.01); *G06F 3/045* (2013.01)

(58) Field of Classification Search
CPC ...... G06F 3/0414; G06F 3/0412; G06F 3/045; G06F 3/0418
See application file for complete search history.

(56) References Cited

U.S. PATENT DOCUMENTS 5,035,148 A    7/1991  Okada
2018/0210601 A1*  7/2018  Chi ..................... G06F 3/04144
(Continued)

FOREIGN PATENT DOCUMENTS

CN    108235748 A    6/2018
CN    207557911 U    6/2018
(Continued)

OTHER PUBLICATIONS

First Office Action regarding Chinese Patent Application No. 202110204586.3, dated Aug. 29, 2023. Translation provided by Bohui Intellectual Property.
(Continued)

*Primary Examiner* — Brent D Castiaux
(74) *Attorney, Agent, or Firm* — Harness, Dickey & Pierce, P.L.C.

(57) ABSTRACT

A pressure-sensing module includes: a circuit board having a first surface and a second surface opposite and parallel to each other, multiple elastic members electrically, and multiple piezoresistors. A first piezoresistor and a second piezoresistor are located on the first surface. A third piezoresistor is located on the second surface, one terminal is connected to the first elastic member and the other terminal is connected to the second elastic member or a fourth elastic member, so as to form a first channel. A fourth piezoresistor is located on the second surface, one terminal is connected to the third elastic member and the other terminal is connected to the fourth elastic member or the second elastic member, so as to form a second channel. The first channel and the second channel intersect or are connected to form a bridge circuit.

10 Claims, 9 Drawing Sheets

(56) References Cited

U.S. PATENT DOCUMENTS

2019/0041281 A1\* 2/2019 Li .......................... G06F 3/045
2023/0184604 A1 6/2023 Chen

FOREIGN PATENT DOCUMENTS

| CN | 109917943 A | 6/2019 |
| CN | 111147062 A | 5/2020 |
| CN | 111998976 A | 11/2020 |
| CN | 112860114 A | 5/2021 |
| WO | WO-2018000874 A1 | 1/2018 |

OTHER PUBLICATIONS

International Search Report and Written Opinion of the International Searching Authority regarding International Patent Application No. PCT/CN2022/076758, dated May 6, 2022. Translation provided by Bohui Intellectual Property.

\* cited by examiner

PRESSURE-SENSING MODULE AND ELECTRONIC DEVICE

CROSS-REFERENCE TO RELATED APPLICATIONS

This application is a Bypass Continuation Application of PCT/CN2022/076758 filed on Feb. 18, 2022, which claims priority to Chinese Patent Application No. 202110204586.3 filed on Feb. 24, 2021, which are incorporated herein by reference in their entirety.

TECHNICAL FIELD

This application pertains to the field of mobile terminals, and specifically relates to a pressure-sensing module and an electronic device.

BACKGROUND

With the rapid development of science and technology, functions of terminal devices are getting diversified, and users have increasingly high requirements for human-computer interaction technology.

Currently, a pressure sensor in a mobile terminal is disposed on the side of the body, and the pressure-sensing module is triggered by pressing the side frame to implement corresponding functions. In addition, due to the tendency towards lighter and thinner mobile terminals, thickness of mobile terminals keeps decreasing. As a result, only simple pressure detection can be performed on the side of the body, limiting the pressure-sensing detection and making it difficult to recognize complex pressing operations.

SUMMARY

According to a first aspect, an embodiment of this application discloses a pressure-sensing module including: a circuit board, where the circuit board has a first surface and a second surface provided opposite each other and parallel to each other; multiple elastic members, where the multiple elastic members are electrically connected to the circuit board, and the multiple elastic members include a first elastic member, a second elastic member, a third elastic member and a fourth elastic member; multiple piezoresistors including a first piezoresistor, a second piezoresistor, a third piezoresistor, and a fourth piezoresistor, where the first piezoresistor is located on the first surface, two terminals of the first piezoresistor are respectively connected to the first elastic member and the second elastic member, the third piezoresistor is located on the second surface, one terminal of the third piezoresistor is connected to the first elastic member and another terminal is connected to the second elastic member or the fourth elastic member, and the first piezoresistor and the third piezoresistor are electrically connected and form a first channel; the second piezoresistor is located on the first surface, two terminals of the second piezoresistor are respectively connected to the third elastic member and the fourth elastic member, the fourth piezoresistor is located on the second surface, one terminal of the fourth piezoresistor is connected to the third elastic member and another terminal is connected to the fourth elastic member or the second elastic member, and the second piezoresistor and the fourth piezoresistor are electrically connected and form a second channel; and the first channel and the second channel intersect or are connected to form a bridge circuit, where the bridge circuit is configured to detect a pressure value based on an electrical parameter difference between the first channel and the second channel.

According to a second aspect, an embodiment of this application provides an electronic device. The electronic device includes the pressure-sensing module according to the first aspect, a screen display module, and a pressure sensing control unit, where the pressure-sensing module is provided under the screen display module.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances so that the embodiments of this application can be implemented in other orders than the order illustrated or described herein. In addition, in the specification and claims, "and/or" represents presence of at least one of connected objects, and the symbol "/" in this specification usually indicates an "or" relationship between associated objects.

The following describes in detail a pressure-sensing module provided in the embodiments of this application through some embodiments and application scenarios thereof with reference to the accompanying drawings.

Figure 1:
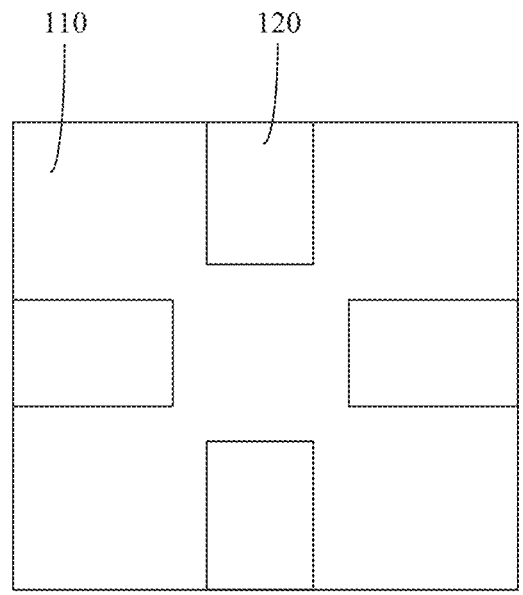
FIG. 1 is a schematic diagram of a structure of a pressure-sensing module disclosed in an embodiment of this application.

FIG. 1 is a schematic diagram of a structure of a pressure-sensing module disclosed in an embodiment of this application. As shown in FIG. 1, the pressure-sensing module mainly includes a circuit board 110, where the circuit board 110 has a first surface and a second surface provided opposite each other and parallel to each other; FIG. 1 can be viewed as a top view of the circuit board 110, then it can be considered that FIG. 1 shows the first surface, and FIG. 1 can also be viewed as a vertical view of the circuit board 110, then it can be considered that FIG. 1 shows the second surface; multiple elastic members 120, where the multiple elastic members 120 include a first elastic member, a second elastic member, a third elastic member, and a fourth elastic member; and multiple piezoresistors including a first piezoresistor, a second piezoresistor, a third piezoresistor, and a fourth piezoresistor.

In this embodiment of this application, the first piezoresistor is located on the first surface of the circuit board 110, two terminals of the first piezoresistor are respectively connected to the first elastic member and the second elastic member, the third piezoresistor is located on the second surface of the circuit board, one terminal of the third piezoresistor is connected to the first elastic member and the other terminal is connected to the second elastic member or the fourth elastic member, and the first piezoresistor and the third piezoresistor are electrically connected to form a first channel; the second piezoresistor is located on the first surface of the circuit board 110, two terminals of the second piezoresistor are respectively connected to the third elastic member and the fourth elastic member, the fourth piezoresistor is located on the second surface of the circuit board 110, one terminal of the fourth piezoresistor is connected to the third elastic member and the other terminal is connected to the fourth elastic member or the second elastic member, and the second piezoresistor and the fourth piezoresistor are electrically connected to form a second channel; and the first channel and the second channel intersect or are connected to form a bridge circuit, where the bridge circuit is configured to detect a pressure value based on an electrical parameter difference between the first channel and the second channel.

Figure 2:
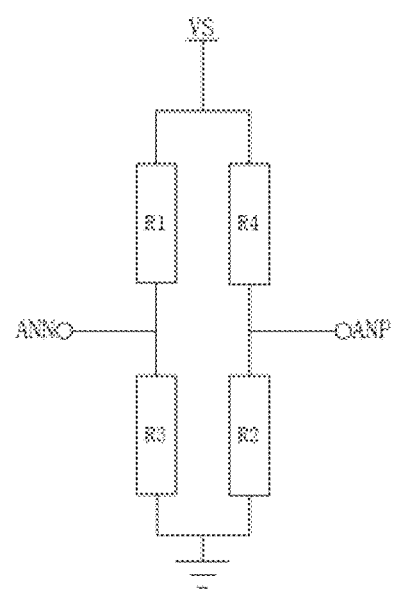
FIG. 2 is a principle diagram of deformation detection of a pressure-sensing module disclosed in an embodiment of this application.

In a specific application, the first piezoresistor, the second piezoresistor, the third piezoresistor and the fourth piezoresistor, together with the first elastic member, the second elastic member, the third elastic member and the fourth elastic member, form a Wheatstone bridge, and the Wheatstone bridge is used to form a complete detection channel. FIG. 2 is a principle diagram of a single detection channel. As shown in FIG. 2, when a screen is pressed to produce deformation, the screen transmits pressure to the elastic member 120, and then the first piezoresistor and second piezoresistor provided on the first surface of the circuit board 110 are squeezed shorter, meaning that resistance R1 of the first piezoresistor and resistance R2 of the second piezoresistor decrease, while the third piezoresistor and fourth piezoresistor provided on the second surface of the circuit board 110 are squeezed and elongated, meaning that resistance R3 of the third piezoresistor and resistance R4 of the fourth piezoresistor increase. In this case, the following is used:

$$VANN = VS \times R3/(R1+R3); \text{ and}$$

$$VANP = VS \times R2/(R2+R4); \text{ where}$$

VANN is a voltage of the first channel formed by connecting the first piezoresistor and the third piezoresistor via the elastic member 120; VANP is a voltage of the second channel formed by connecting the second piezoresistor and the fourth piezoresistor via the elastic member 120; and VS is the voltage of a common node.

According to the foregoing formulas, when R1 decreases and R3 increases, VANN in the Wheatstone bridge increases; and when R2 decreases and R4 increases, VANP in the Wheatstone bridge decreases.

In addition, a voltage difference between the first channel and the second channel is:

$$\Delta U = VANN - VANP.$$

Therefore, the pressure value can be determined based on a change of the voltage difference $\Delta U$ between the first channel and the second channel, thereby implementing pressure detection of the screen.

In this embodiment of this application, the multiple piezoresistors and the multiple elastic members 120 are connected in different manners to form a Wheatstone bridge, so as to determine a pressure value based on the voltage difference between the first channel and the second channel. The pressure-sensing module is applied to a two-dimensional screen, thus implementing pressure detection of the two-dimensional screen.

Figure 3:
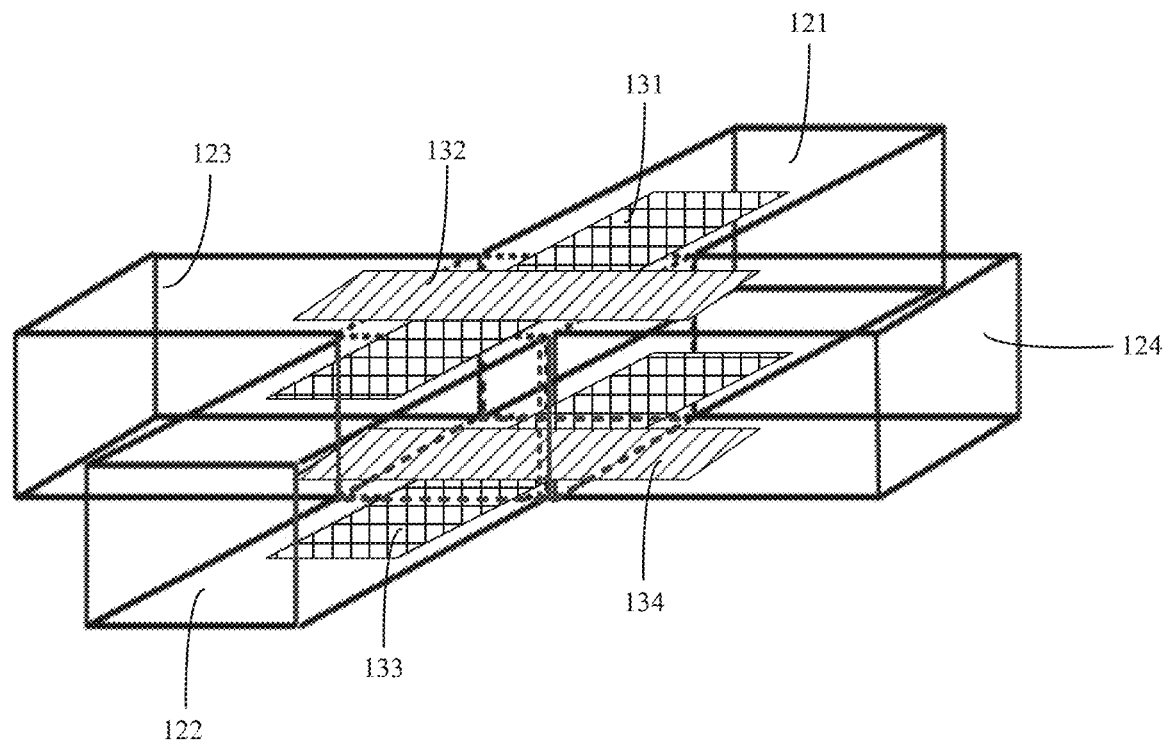
FIG. 3 is a schematic diagram of another structure of a pressure-sensing module disclosed in an embodiment of this application.
Figure 4A:
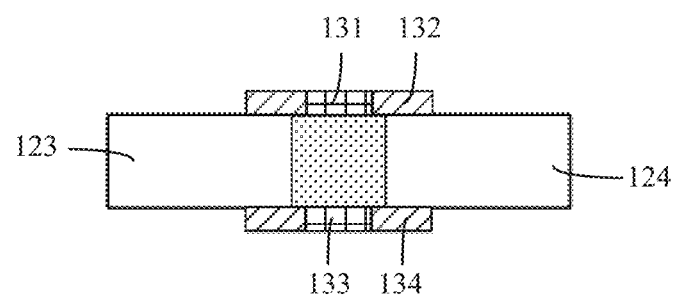
FIG. 4A and FIG. 4B are respectively a main view and a top view of the pressure-sensing module shown in FIG. 3.
Figure 4B:
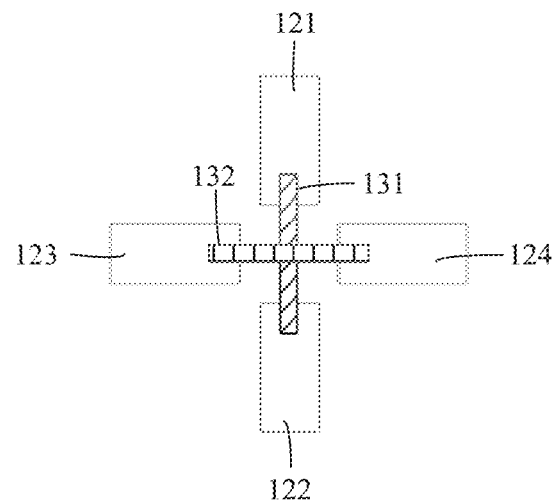

In a possible implementation, as shown in FIG. 3, two terminals of the first piezoresistor 131 are respectively connected to the first elastic member 121 and the second elastic member 122, two terminals of the third piezoresistor 133 are respectively connected to the first elastic member 121 and the second elastic member 122, and the first piezoresistor 131 and the third piezoresistor 133 are electrically connected to form the first channel. Two terminals of the second piezoresistor 132 are respectively connected to the third elastic member 123 and the fourth elastic member 124, two terminals of the fourth piezoresistor 134 are respectively connected to the third elastic member 123 and the fourth elastic member 124, and the second piezoresistor 132 and the fourth piezoresistor 134 are electrically connected to form the second channel. FIG. 4A and FIG. 4B are respectively a main view and a top view of the pressure-sensing module disclosed in this embodiment.

In this possible implementation, the first elastic member 121 is electrically connected to a first side of the circuit board 110, the second elastic member 122 is electrically connected to an opposite side of the first side, the third elastic member 123 is electrically connected to an adjacent side of the first side, and the fourth elastic member 124 is electrically connected to another adjacent side of the first side. The first piezoresistor 131, the second piezoresistor 132, the third piezoresistor 133, and the fourth piezoresistor 134 are in-line resistors. The first piezoresistor 131 and the second piezoresistor 132 cross, and the third piezoresistor 133 and the fourth piezoresistor 134 cross. The first piezoresistor 131 and the third piezoresistor 133 are connected via the first elastic member 121 and the second elastic member 122 to form the first channel, the second piezoresistor 132 and the fourth piezoresistor 134 are connected via the third elastic member 123 and the fourth elastic member 124 to form the second channel, and the first channel and the second channel intersect to form a bridge circuit.

In this embodiment of this application, through the bridge circuit formed by intersection of the first channel and the second channel, the pressure-sensing module can be applied to the two-dimensional screen, thereby implementing the pressure detection of the two-dimensional screen. In addition, the first piezoresistor 131 and the second piezoresistor 132 are disposed intersecting with one another, and the third piezoresistor 133 and the fourth piezoresistor 134 are disposed intersecting with one another. Such design is simple, making the structure of the entire pressure-sensing module much smaller compared to the entire device.

Figure 5:
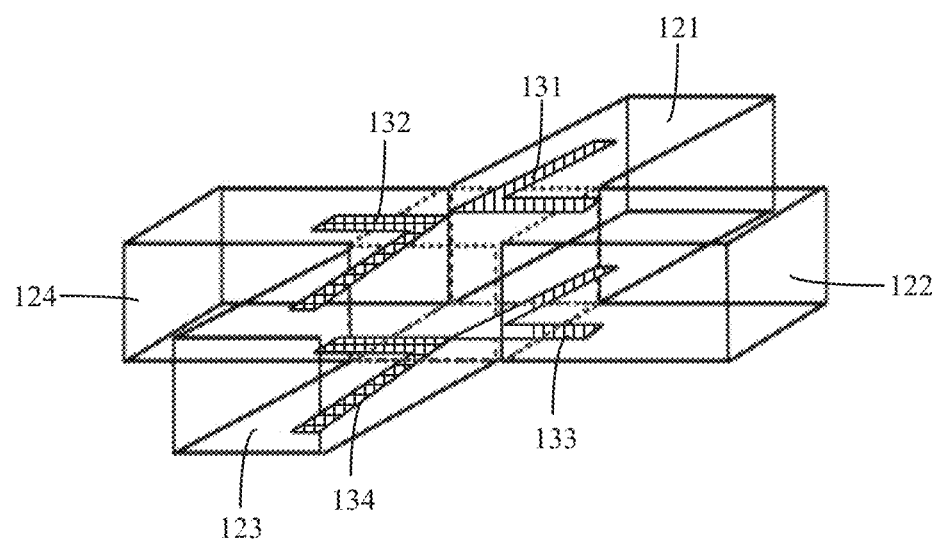
FIG. 5 is a schematic diagram of still another structure of a pressure-sensing module disclosed in an embodiment of this application.
Figure 6A:
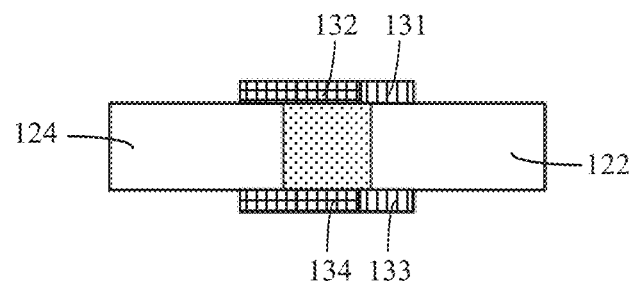
FIG. 6A and FIG. 6B are respectively a main view and a top view of the pressure-sensing module shown in FIG. 5.
Figure 6B:
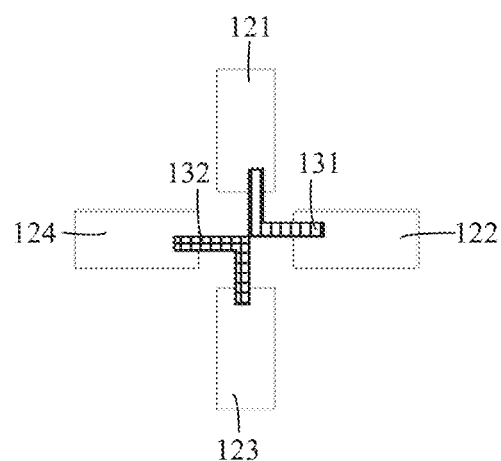

In an optional implementation, as shown in FIG. 5, the first elastic member 121 is electrically connected to a first side of the circuit board 110, the second elastic member 122 is electrically connected to an adjacent side of the first side, the third elastic member 123 is electrically connected to an opposite side of the first side, and the fourth elastic member 124 is electrically connected to another adjacent side of the first side. The first piezoresistor 131, the second piezoresistor 132, the third piezoresistor 133, and the fourth piezoresistor 134 are bent-type resistors. The first piezoresistor 131 and the second piezoresistor 132 are connected at a bending position, and the third piezoresistor 133 and the fourth piezoresistor 134 are connected at a bending position. FIG. 6A and FIG. 6B are respectively a main view and a top view of the pressure-sensing module disclosed in this embodiment.

This possible implementation not only allows the pressure-sensing module to be applied to a two-dimensional screen to detect screen pressure, but also avoids the slight deformation caused by overlapping in-line resistors to form a Wheatstone bridge.

Figure 7:
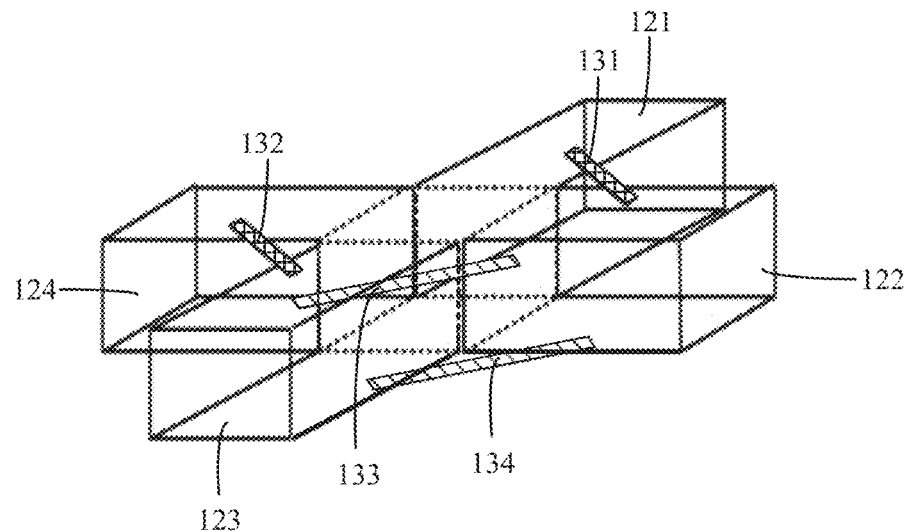
FIG. 7 is a schematic diagram of yet still another structure of a pressure-sensing module disclosed in an embodiment of this application.
Figure 8A:
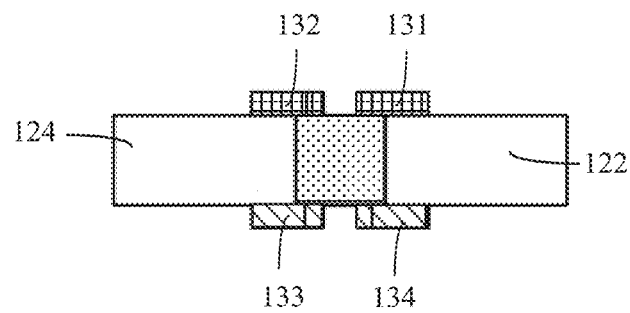
FIG. 8A and FIG. 8B are respectively a main view and a top view of the pressure-sensing module shown in FIG. 7.
Figure 8B:
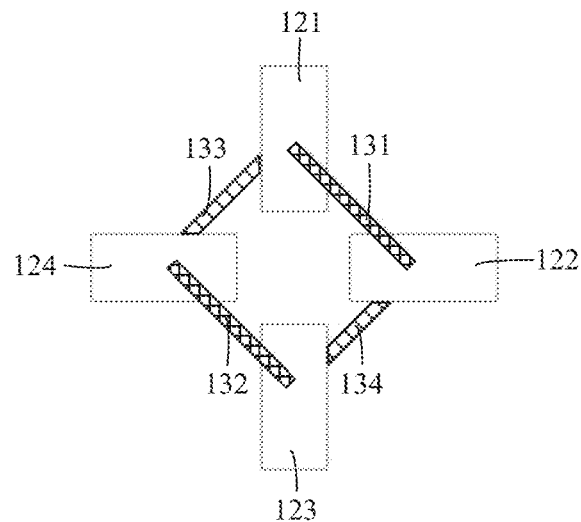

In another possible implementation, as shown in FIG. 7, two terminals of the first piezoresistor 131 are respectively connected to the first elastic member 121 and the second elastic member 122, two terminals of the third piezoresistor 133 are respectively connected to the first elastic member 121 and the fourth elastic member 124, and the first piezoresistor 131 and the third piezoresistor 133 are electrically connected to form the first channel. Two terminals of the second piezoresistor 132 are respectively connected to the third elastic member 123 and the fourth elastic member 124, two terminals of the fourth piezoresistor 134 are respectively connected to the third elastic member 123 and the second elastic member 122, and the second piezoresistor 132 and the fourth piezoresistor 134 are electrically connected to form the second channel. FIG. 8A and FIG. 8B are respectively a main view and a top view of the pressure-sensing module disclosed in this embodiment.

In this possible implementation, the first elastic member 121 is electrically connected to a first side of the circuit board 110, the second elastic member 122 is electrically connected to an adjacent side of the first side, the third elastic member 123 is electrically connected to an opposite side of the first side, and the fourth elastic member 124 is electrically connected to another adjacent side of the first side. The first piezoresistor 131, the second piezoresistor 132, the third piezoresistor 133, and the fourth piezoresistor 134 are in-line resistors. The first piezoresistor 131 and the third piezoresistor 133 are connected via the first elastic member 121 to form the first channel, the second piezoresistor 132 and the fourth piezoresistor 134 via the third elastic member 123 to form the second channel, and the first channel and the second channel are connected to form a bridge circuit.

In this embodiment of this application, the first piezoresistor 131 and the third piezoresistor 133 are connected via the first elastic member 121 to form the first channel, the second piezoresistor 132 and the fourth piezoresistor 134 are connected via the third elastic member 123 to form the second channel, the first channel and the second channel are connected to form the Wheatstone bridge, and the piezoresistor are in-line resistors. This can ensure that the piezoresistors change evenly when under pressure, and also avoid mutual extrusion between the resistors from causing slight deformation.

Figure 9:
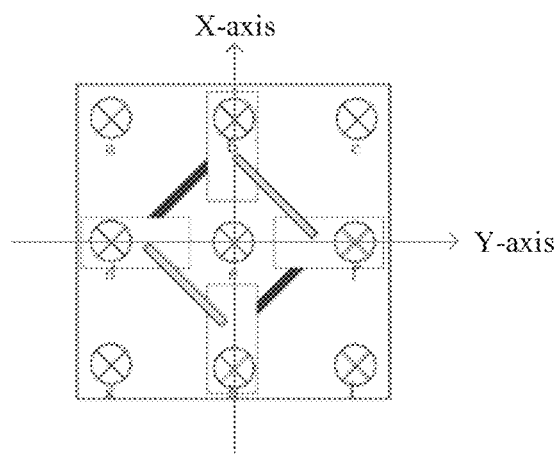
FIG. 9 is a schematic diagram of an application of a single pressure-sensing module disclosed in an embodiment of this application.
Figure 10:
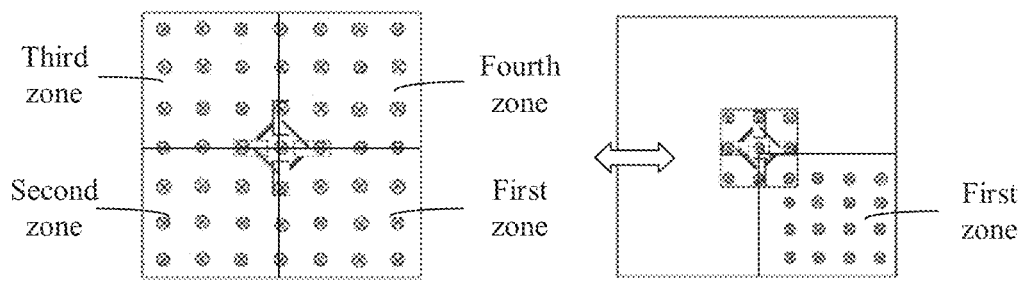
FIG. 10 is a schematic diagram of another application of a single pressure-sensing module disclosed in an embodiment of this application.

FIG. 9 is a schematic diagram of an application of a single pressure-sensing module disclosed in an embodiment of this application. As shown in FIG. 9, zone e is the central position of the pressure-sensing module, zones c and g, a and i, d and f, and b and h are centrally symmetrical, a and c, and g and i are symmetrical with respect to the X-axis, and a and g, and c and i are symmetrical with respect to the Y-axis. When the screen is pressed with equal force, feedback variables in the symmetrical zones are consistent. In other words, when the positions a, c, g, and i are pressed with equal force, the feedback variables obtained are consistent; and when the positions b, d, h, and f are pressed with equal force, the feedback variables obtained are consistent. Due to such symmetry characteristic, a single pressure-sensing module can be placed on the full screen for pressure-sensing calibration. As shown in FIG. 10, the feedback variables obtained in a second zone, a third zone, and a fourth zone are consistent with the feedback variable obtained in a first zone when the screen is pressed with equal force, so only the first zone needs to be monitored in performing pressure-sensing calibration on the full screen.

In the foregoing application embodiment, optionally, the circuit board 110 may be a flexible circuit board, and the piezoresistor may be a deformable resistor printed on the flexible circuit board.

In a possible implementation, the multiple elastic members 120 are made of conductive materials. For example, the elastic members 120 may be steel sheets. The multiple elastic members 120 are electrically connected to the circuit board 110, where the first elastic member 121, the second elastic member 122, the third elastic member 123, and the fourth elastic member 124 respectively wrap one edge of the circuit board.

Figure 11:
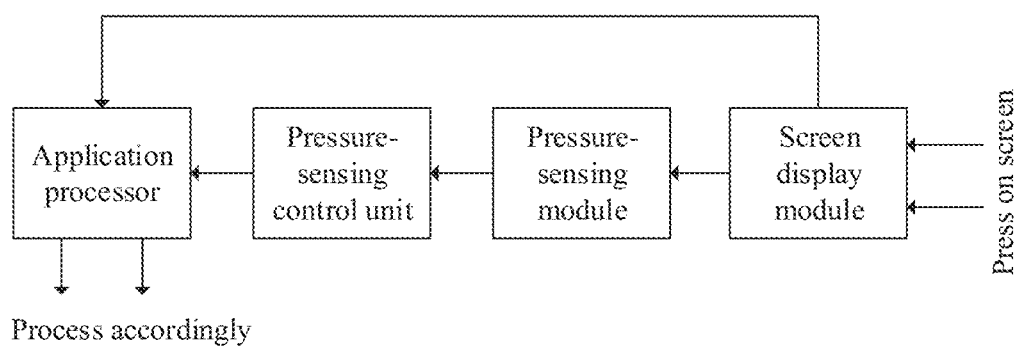
FIG. 11 is a schematic diagram of a structure of an electronic device disclosed in an embodiment of this application.

Optionally, an embodiment of this application further provides an electronic device. As shown in FIG. 11, the electronic device includes the pressure-sensing module disclosed in the foregoing embodiment of this application, a screen display module, a pressure-sensing control unit, and an application processor, where the pressure-sensing module is provided under the screen display module. In the electronic device, the screen display module deforms w % ben pressed, and the screen display module transmits press position information to the application processor, and transmits the deformation quantity to the pressure-sensing module. The pressure-sensing module quantifies the deformation quantity, converts the deformation quantity into a pressure value, and transmits the pressure value to the pressure-sensing control unit. The pressure-sensing control unit transmits the pressure value to the application processor. The application processor receives the position information of the pressing and the pressure value and performs processing accordingly.

Figure 12:
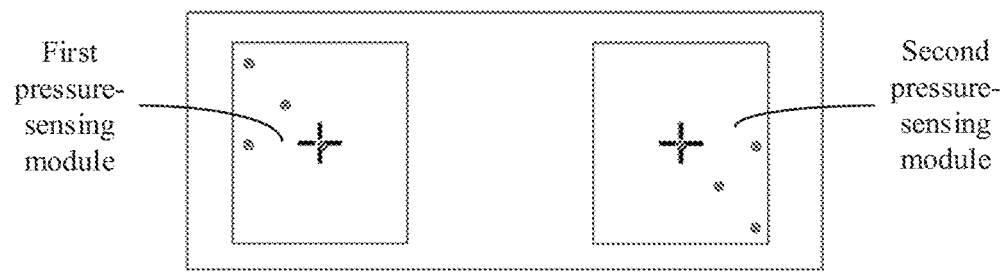
FIG. 12 is a schematic diagram of another structure of an electronic device disclosed in an embodiment of this application.

In this possible implementation, the electronic device includes at least two pressure-sensing modules, the at least two pressure-sensing modules are provided symmetrically with respect to the symmetry axis of the screen display module. As shown in FIG. 12, the electronic device including two pressure-sensing modules is used as an example, the first pressure-sensing module and the second pressure-sensing module are identical (that is, when the same positions of the two pressure-sensing modules are pressed, the feedback variables obtained are consistent). The first pressure-sensing module and the second pressure-sensing module are arranged symmetrically with respect to the symmetry axis of the screen display module. When equal force is applied to the corresponding positions of the first pressure-sensing module and second pressure-sensing module marked in FIG. 12, the obtained feedback variables are consistent due to the respective symmetry of the pressure-sensing modules. Therefore, complete and accurate feedback can be obtained by calibrating the electronic device at the positions shown in FIG. 12, simplifying the calibration process of under-screen pressure-sensing feedback at the application layer of the entire device.

Figure 13:
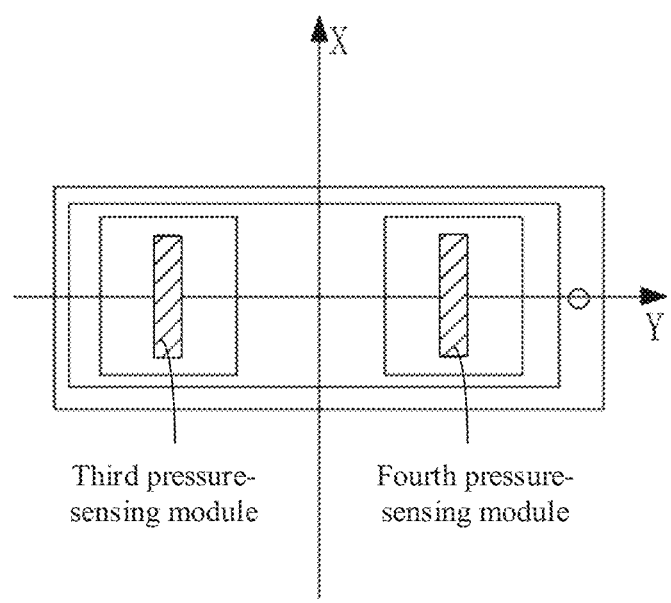
FIG. 13 is a schematic diagram of an application of a strip-shaped pressure-sensing module disclosed in an embodiment of this application.
Figure 14:
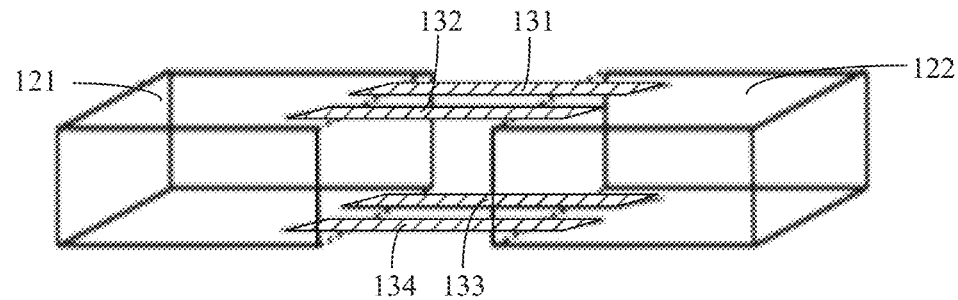
FIG. 14 is a schematic diagram of a structure of a strip-shaped pressure-sensing module disclosed in an embodiment of this application.

In a possible implementation, as shown in FIG. 13, a strip-shaped pressure-sensing module provided on a side of the mobile terminal body can be placed directly under the screen display module. As shown in FIG. 13, a third pressure-sensing module and a fourth pressure-sensing module are provided symmetrically with respect to the symmetry axis of the screen display module. FIG. 14 is a structural diagram of a single strip-shaped pressure-sensing module. As shown in FIG. 14, compared to that four pressure-sensing modules cooperate with four piezoresistors to form a Wheatstone bridge in the foregoing embodiment of this application, the strip-shaped pressure-sensing module includes two elastic members and four piezoresistors, and the two elastic members cooperate with the four piezoresistors to form a Wheatstone bridge. For example, the first piezoresistor 131 and the second piezoresistor 132 are provided on the first surface of the circuit board 110, the first piezoresistor 131 and the second piezoresistor 132 are disposed in parallel, two terminals of the first piezoresistor 131 are respectively connected to the first elastic member 121 and the second elastic member 122, two terminals of the second piezoresistor 132 are respectively connected to the first elastic member 121 and the second elastic member 122. The third piezoresistor 133 and the fourth piezoresistor 134 are provided on the second surface of the circuit board 110, the third piezoresistor 133 and the fourth piezoresistor 134 are disposed in parallel, two terminals of the third piezoresistor 133 are respectively connected to the first elastic member 121 and the second elastic member 122, and two terminals of the fourth piezoresistor 134 are respectively connected to the fourth elastic member 124 and the second elastic member 122.

Figure 15:
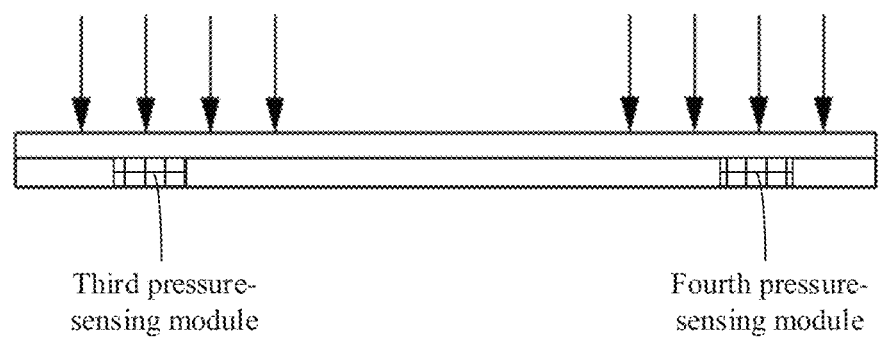
FIG. 15 is a schematic diagram of another application of a strip-shaped pressure-sensing module disclosed in an embodiment of this application.

FIG. 15 is a schematic diagram of pressing detection in a case that strip-shaped pressure-sensing modules are applied to the entire device. When the screen is pressed, pressure signals received by the pressure-sensing module are scattered in the horizontally symmetrical zones around the long strip, the pressure-sensing signal detected in the Y-axis direction is extremely strong, but the pressure-sensing signal in the X-axis direction is extremely low and unstable, so when the application requires detection of the pressure-sensing signal in the X-axis direction, there is a high risk of detection failure. To avoid such risk, it is necessary to perform fitting using mathematical algorithms or perform full-screen calibration, which is highly inconvenient. In addition, in this possible implementation, the strip-shaped pressure-sensing module, when applied to the two-dimensional screen, occupies a large space, restricting the stacking of devices such as the camera and speaker. As a result, mobile terminals or devices cannot be ensured to be light and thin.

Therefore, compared with the strip-shaped pressure-sensing module, the pressure-sensing module in the foregoing embodiment of this application can detect the screen pressure more accurately, avoiding the problem of extremely low and unstable pressure signal detected in the X-axis direction that occurs in the strip-shaped pressure-sensing module. In addition, the space occupied by the Wheatstone bridge formed by four piezoresistors and four elastic members is much smaller, reducing the space occupancy of the entire device. In addition, due to the symmetry, the pressure-sensing module in the foregoing embodiment of this application greatly simplifies the calibration process of the device application layer for under-screen pressure-sensing feedback compared to the strip-shaped pressure-sensing module.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:
1. A pressure-sensing module, comprising:
a circuit board, wherein the circuit board has a first surface and a second surface disposed opposite each other and parallel to each other;
multiple elastic members, wherein the multiple elastic members are electrically connected to the circuit board, and the multiple elastic members comprise a first elastic member, a second elastic member, a third elastic member, and a fourth elastic member; and
multiple piezoresistors comprising a first piezoresistor, a second piezoresistor, a third piezoresistor and a fourth piezoresistor, wherein
the first piezoresistor is located on the first surface, two terminals of the first piezoresistor are respectively connected to the first elastic member and the second elastic member; the third piezoresistor is located on the second surface, one terminal of the third piezoresistor is connected to the first elastic member and another terminal is connected to the second elastic member or the fourth elastic member; and the first piezoresistor and the third piezoresistor are electrically connected and form a first channel;
the second piezoresistor is located on the first surface, two terminals of the second piezoresistor are respectively connected to the third elastic member and the fourth elastic member; the fourth piezoresistor is located on the second surface, one terminal of the fourth piezoresistor is connected to the third elastic member and another terminal is connected to the fourth elastic member or the second elastic member; and the second piezoresistor and the fourth piezoresistor are electrically connected and form a second channel; and
the first channel intersects or connects with the second channel to form a bridge circuit, wherein the bridge circuit is configured to detect a pressure value based on an electrical parameter difference between the first channel and the second channel.

2. The pressure-sensing module according to claim 1, wherein in a case that the another terminal of the third piezoresistor is connected to the second elastic member and the another terminal of the fourth piezoresistor is connected to the fourth elastic member, the first elastic member is electrically connected to a first side of the circuit board, the second elastic member is electrically connected to an opposite side of the first side, the third elastic member is electrically connected to an adjacent side of the first side, and the fourth elastic member is electrically connected to another adjacent side of the first side, wherein the first piezoresistor, the second piezoresistor, the third piezoresistor, and the fourth piezoresistor are in-line resistors, the first piezoresistor and the second piezoresistor cross, and the third piezoresistor and the fourth piezoresistor cross.

3. The pressure-sensing module according to claim 1, wherein in a case that the another terminal of the third piezoresistor is connected to the second elastic member and the another terminal of the fourth piezoresistor is connected to the fourth elastic member, the first elastic member is electrically connected to a first side of the circuit board, the second elastic member is electrically connected to an adjacent side of the first side, the third elastic member is electrically connected to an opposite side of the first side, and the fourth elastic member is electrically connected to another adjacent side of the first side, wherein the first piezoresistor, the second piezoresistor, the third piezoresistor, and the fourth piezoresistor are bent-type resistors, the first piezoresistor and the second piezoresistor are connected at a bending position, and the third piezoresistor and the fourth piezoresistor are connected at a bending position.

4. The pressure-sensing module according to claim 1, wherein in a case that the another terminal of the third piezoresistor is connected to the fourth elastic member and the another terminal of the fourth piezoresistor is connected to the second elastic member, the first elastic member is electrically connected to a first side of the circuit board, the second elastic member is electrically connected to an adjacent side of the first side, the third elastic member is electrically connected to an opposite side of the first side, and the fourth elastic member is electrically connected to another adjacent side of the first side, wherein the first piezoresistor, the second piezoresistor, the third piezoresistor, and the fourth piezoresistor are in-line resistors, the first piezoresistor and the third piezoresistor are connected via the first elastic member, and the second piezoresistor and the fourth piezoresistor are connected via the third elastic member.

5. The pressure-sensing module according to claim 1, wherein the circuit board is a flexible circuit board.

6. The pressure-sensing module according to claim 1, wherein the elastic member is made of a conductive material, and that the multiple elastic members are electrically connected to the circuit board comprises:

the first elastic member, the second elastic member, the third elastic member, and the fourth elastic member respectively wrap one edge of the circuit board.

7. An electronic device, comprising: a pressure-sensing module, a screen display module, and a pressure-sensing control unit, wherein the pressure-sensing module is provided under the screen display module;

the pressure-sensing module comprises;

a circuit board, wherein the circuit board has a first surface and a second surface disposed opposite each other and parallel to each other;

multiple elastic members, wherein the multiple elastic members are electrically connected to the circuit board, and the multiple elastic members comprise a first elastic member, a second elastic member, a third elastic member, and a fourth elastic member; and multiple piezoresistors comprising a first piezoresistor, a second piezoresistor, a third piezoresistor, and a fourth piezoresistor, wherein the first piezoresistor is located on the first surface, two terminals of the first piezoresistor are respectively connected to the first elastic member and the second elastic member; the third piezoresistor is located on the second surface, one terminal of the third piezoresistor is connected to the first elastic member and another terminal is connected to the second elastic member or the fourth elastic member; and the first piezoresistor and the third piezoresistor are electrically connected and form a first channel;

the second piezoresistor is located on the first surface, two terminals of the second piezoresistor are respectively connected to the third elastic member and the fourth elastic member; the fourth piezoresistor is located on the second surface, one terminal of the fourth piezoresistor is connected to the third elastic member and another terminal is connected to the fourth elastic member or the second elastic member; and the second piezoresistor and the fourth piezoresistor are electrically connected and form a second channel; and the first channel intersects or connects with the second channel to form a bridge circuit, wherein the bridge circuit is configured to detect a pressure value based on an electrical parameter difference between the first channel and the second channel.

8. The electronic device according to claim 7, wherein the electronic device comprises at least two pressure-sensitive modules arranged symmetrically along the axis of symmetry of the screen display module.

9. The electronic device according to claim 7, wherein the electronic device further comprises: an application processor, wherein the screen display module is configured to transmit received pressure to the pressure-sensing module and transmit pressing position information to the application processor.

10. The electronic device according to claim 9, wherein the pressure-sensing control unit is configured to process a pressure value detected by the pressure-sensing module and transmit the pressure value to the application processor.

* * * * *